United States Patent
Wu et al.

(10) Patent No.: US 9,748,860 B2
(45) Date of Patent: Aug. 29, 2017

(54) INPUT FILTER PRE-CHARGE FED BY A MEDIUM-VOLTAGE GRID SUPPLY

(71) Applicant: GE Energy Power Conversion Technology Ltd, Warwickshire (GB)

(72) Inventors: Tao Wu, ShangHai (CN); Yan Liu, ShangHai (CN)

(73) Assignee: GE ENERGY POWER CONVERSION TECHNOLOGY LTD, Rugby (GB)

( * ) Notice: Subject to any disclaimer, the term of this patent is extended or adjusted under 35 U.S.C. 154(b) by 11 days.

(21) Appl. No.: 14/892,598

(22) PCT Filed: May 20, 2013

(86) PCT No.: PCT/CN2013/075902
§ 371 (c)(1),
(2) Date: Nov. 20, 2015

(87) PCT Pub. No.: WO2014/186933
PCT Pub. Date: Nov. 27, 2014

(65) Prior Publication Data
US 2016/0126858 A1 May 5, 2016

(51) Int. Cl.
*H02M 1/36* (2007.01)
*H02M 1/32* (2007.01)
(Continued)

(52) U.S. Cl.
CPC ........... *H02M 7/125* (2013.01); *H02M 1/126* (2013.01); *H02M 1/32* (2013.01); *H02M 1/36* (2013.01); *H02M 7/217* (2013.01)

(58) Field of Classification Search
CPC  H02H 7/10; H02H 7/12; H02H 7/125; H02H 7/16; H02M 7/162; H02M 7/219; H02M 7/1623; H02M 1/32; H02M 1/36
See application file for complete search history.

(56) References Cited

U.S. PATENT DOCUMENTS 7,092,262 B2 * 8/2006 Ryan ..................... H02M 7/062
 323/207
7,965,529 B2 6/2011 Gibbs et al.
(Continued)

FOREIGN PATENT DOCUMENTS

CN 101789600 A 7/2010
CN 201523337 U 7/2010
(Continued)

OTHER PUBLICATIONS

International Search Report and Written Opinion dated Feb. 20, 2014 which was issued in connection with PCT Patent Application No. PCT/CN13/075902 which was filed on May 20, 2013.
Xia et al., "Analysis of Inrush Current and Over-Voltage with HVDC AC Filters Switching On", 2012 Power Engineering and Automation Conference, IEEE, pp. 1-4, Sep. 18, 2012.
(Continued)

*Primary Examiner* — Gary L Laxton
(74) *Attorney, Agent, or Firm* — GE Global Patent Operation; Scott R. Stanley (57) ABSTRACT

A device includes a transformer configured to supply a pre-charge voltage to a capacitor and a converter configured for coupling to the transformer and responsive to an increasing modulation index. The modulation index increases for a time quanta after the capacitor becomes substantially fully charged and the pre-charge voltage is substantially constant during the time quanta.

20 Claims, 5 Drawing Sheets

(51) Int. Cl.
      *H02M 7/219*    (2006.01)
      *H02H 7/125*    (2006.01)
      *H02M 7/12*      (2006.01)
      *H02M 7/217*    (2006.01)
      *H02M 1/12*      (2006.01)

(56) References Cited

U.S. PATENT DOCUMENTS

| | | | | |
|---|---|---|---|---|
| 8,253,273 B2 * | 8/2012 | Fredette | ............... | H02M 1/10 307/51 |
| 2006/0208809 A1 | 9/2006 | Erdogan | | |

FOREIGN PATENT DOCUMENTS

| | | | |
|---|---|---|---|
| CN | 102075108 | A | 5/2011 |
| CN | 101895205 | B | 10/2012 |
| CN | 102832833 | A | 12/2012 |
| CN | 102916437 | A | 2/2013 |
| JP | 0646571 | A | 2/1994 |
| JP | 2004088972 | A | 3/2004 |
| JP | 2005270003 | A | 10/2005 |
| JP | 2006340466 | A | 12/2006 |

OTHER PUBLICATIONS

European Search Report and Opinion issued in connection with corresponding EP Application No. 13885323.9 dated Jan. 2, 2017.
Unofficial translation of CN Office Action dated Jun. 28, 2017 in connection with corresponding CN Application 201380076780.1.

\* cited by examiner

FIG. 1
(conventional)

INPUT FILTER PRE-CHARGE FED BY A MEDIUM-VOLTAGE GRID SUPPLY

BACKGROUND

Field of the Invention

The present invention relates generally to the electric grid. More specifically, the present invention relates to reducing overvoltage and in-rush current in high power rectifier input filters used in medium-voltage grid applications.

Description of Related Art

In the generation, transmission, and distribution of conventional electrical power, power is transmitted over long distances, via the electric grid, at high alternating current (AC) voltages. In some cases, and for various reasons, these high AC voltages must be transmitted as high direct current (DC) voltages. A fundamental principle of DC transmission is using a rectifier to transform the AC voltages to DC voltages. High power voltage source, or current source, rectifiers are often used in this process.

As understood by those of skill in the art, high power voltage source or current source rectifiers are normally fed by a medium voltage grid supply. An inductor capacitor (LC) input filter is used to feed the medium voltage grid supply. The LC input filter also assists the commutation process of related power devices and the filtering out of line current harmonics typically associated with high power rectification.

More specifically, the LC filter is designed to achieve a desired level of attenuation of the switching harmonics and to avoid the amplification of residual harmonics during normal operation. However, for high power applications, the input filter for high power rectifiers is lightly damped to avoid excessive power losses.

Inherent power losses in the input filter and the supply transformer provide a minimum degree of damping. Such a low inherent damping factor of the input LC filter usually results in the excessive over-voltage stress across the input filter capacitors followed by a direct connection of the input filter to the medium-voltage grid supply.

The conventional pre-charge solution to this problem is to employ series-connected resistors to reduce both the over-voltage across the capacitors and the associated in-rush current. This solution, however, requires the use of bulky pre-charge resistors. These bulky pre-charge resistors not only degrade the overall system efficiency, but leave limited space for optimization of the pre-charge of the input filter.

Other conventional pre-charge solutions employ additional pre-charge circuit components such as the pre-charge resistor and contactors, resulting in increased system costs and diminish overall system efficiency. These undesirable consequences are especially applicable to high power AC-DC converters directly fed by a medium-voltage grid supply (e.g: 6 kV+). For worst case here, the in-rush current results in serve current distortions at the grid terminal if the pre-charge resistor is not heavy damped.

Other conventional solutions include use an AC side pre-charge instead of a DC side pre-charge. Use of an AC side pre-charge instead of a DC-side pre-charge, however, faces the challenge of having the filter capacitor assume a very small value. The small filter capacitor value creates a correspondingly small impedance formed the connection from each phase to the ground. Therefore, this approach also fails to eliminate the in-rush current and over-voltage.

SUMMARY OF THE INVENTION

Given the aforementioned deficiencies, a need exists for methods and systems to eliminate the need of bulky pre-charge resistors to reduce the over-voltage stress and in-rush current across input filter capacitors. More specifically, methods and systems are needed to facilitate a smooth voltage rise and zero in-rush current when connecting to a medium-voltage grid supply.

Embodiments of the present invention provide a device including a transformer configured to supply a pre-charge voltage to a capacitor and a converter configured for coupling to the transformer and responsive to an increasing modulation index. The modulation index increases for a time quanta after the capacitor becomes substantially fully charged and the pre-charge voltage is substantially constant during the time quanta.

One embodiment provides a totally controlled pre-charge scheme for the input filter without employing any pre-charge resistors to provide a smooth voltage rise over the filter capacitors and zero in-rush current at an AC-side. The exemplary pre-charge scheme can be preprogrammed to deliver constant and low power for the input filter pre-charge during the overall pre-charge process. This approach also uses a pre-charge transformer having a lower power rating. The lower power rating can be leveraged to lower overall system costs and improve overall system efficiency.

In embodiments, AC-side converters are controlled as an inverter during the pre-charge operation to generate a voltage across input filter capacitors which is synchronous with the grid supply voltage. In such manner, a smooth connection of the input filter to the medium-voltage grid supply can be achieved without the need for a clamping circuit to be placed across the input filter at the AC-side of the exemplary circuit's AC-side converters. The pre-charge power achieved in the embodiments can be minimized by programming an appropriate modulation index profile, as discussed in further detail below.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
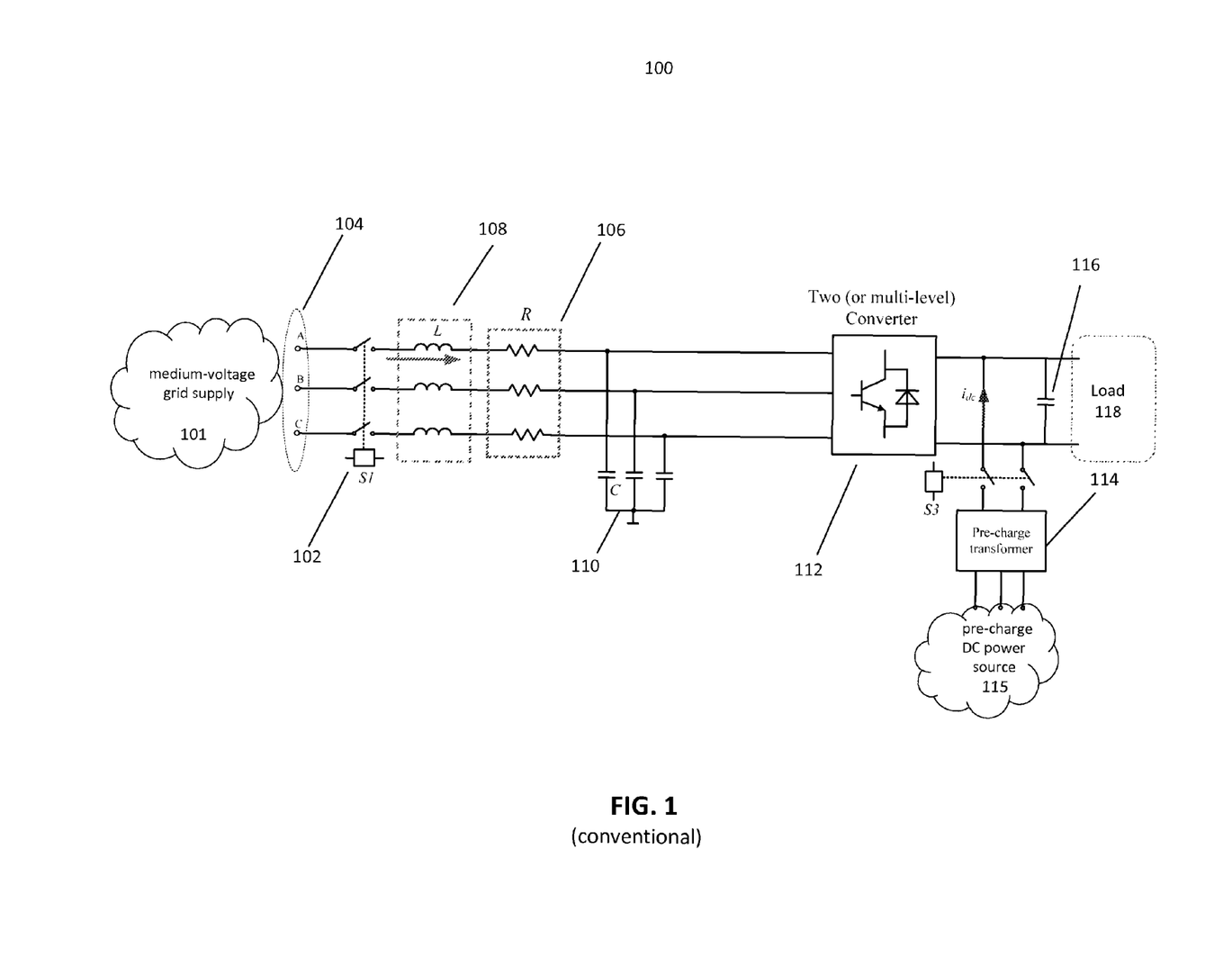
FIG. 1 is a schematic diagram illustration of a conventional pre-charge input filter circuit used to reduce overvoltage and in-rush current.

FIG. 1 is a schematic diagram illustration of a conventional pre-charge circuit 100 used to reduce overvoltage and in-rush current from a medium voltage AC grid supply 101. The pre-charge circuit 100 includes a connector (i.e., switch) 102 to control grid voltage supplied at a connector terminal 104. A damping resistor 106 is positioned in series with an input filter inductor 108 and an input filter capacitor 110.

A two-level converter (e.g., rectifier) 112 provides one more output voltages at levels responsive to a DC pre-charge voltage supplied by a power source 115 via a pre-charge transformer 114. Once the pre-charge process has been completed, the pre-charge transformer 114 provides a DC link current (Idc) to charge a DC side capacitor 116 to drive a load 118, such as a motor, or other equipment.

As understood by those of skill in the art, the purpose of a pre-charge circuit, generally, is to minimize peak current output from a power source by eliminating overvoltage and/or reducing in-rush current. During pre-charging, the system voltage rises slowly and controllably with the output current never exceeding the maximum allowable level.

For example, during operation of the conventional pre-charge circuit 100, when the connector 102 is closed, the medium level grid voltage, supplied by the grid 101, is suddenly received at the connector terminal 104 to initiate charging. The inductor 108 feeds the medium level AC voltage to the pre-charge circuit 100. The damping resistor 106 reduces the initial power-up surge, or in-rush current, and reduces the voltage stress applied to the input filter capacitor 110.

As noted above, the inductor 108, the damping resistor 106, and the capacitor 110 assist in the commutation process of related power devices to achieve the desired attenuation of switching harmonics. In so doing, amplification of residual harmonics, typically associated with high power rectification, can be avoided during normal operation. This conventional approach is loosely referred to as charging from the AC side.

The pre-charge technique performed by the conventional pre-charge circuit 100, however, includes fairly significant deficiencies. For example, the damping resistor 106 is typically very large and bulky, which ultimately increases the overall system costs. The bulky size of the damping resistor 106 also creates production inefficiencies due to the additional printed circuit board (PCB) real estate required to accommodate the resistor. The conventional pre-charge technique of FIG. 1 also prevents optimization of the pre-charge of the input filter.

Figure 2:
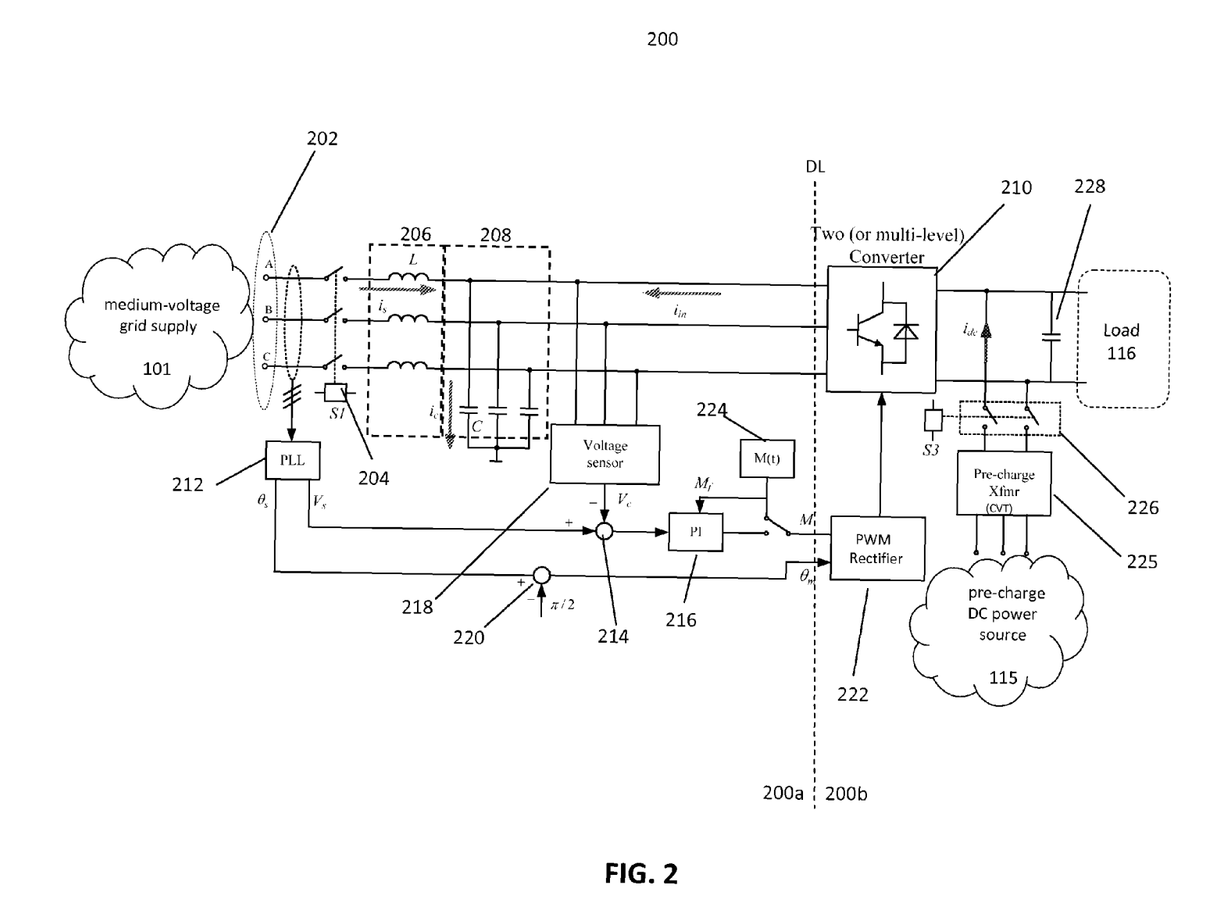
FIG. 2 is a block diagram illustration of an exemplary pre-charge input filter circuit constructed in accordance with an embodiment of the present invention.

FIG. 2 is a block diagram illustration of an exemplary pre-charge circuit 200 constructed in accordance with an embodiment of the present invention. The pre-charge circuit 200 provides a totally controlled pre-charge without employing pre-charge resistors. The pre-charge circuit 200 includes an AC-side 200a and the DC side 200b, divided along a vertical line DL. The exemplary technique, achieved in the pre-charge circuit 200, also provides a smooth voltage rise and virtually zero in-rush current in response to a medium voltage grid supply 101. The approach of the exemplary embodiment of FIG. 2 ultimately reduces the overall system costs.

The exemplary pre-charge circuit 200 includes a connection port 202, a contactor 204, and an inductor 206 connected in series with an input filter capacitor 208. These connections facilitate current flow between a multilevel AC/DC converter rectifier 210 and the medium voltage grid supply 101.

A phase locked loop (PLL) 212, connected across connection port 202, includes two output ports. The first output port produces a grid supply voltage (Vs). The grid supply voltage Vs is combined with a filter capacitor voltage (Vc), in a combiner 214, and the combined voltage is provided as an input to a proportional-integral (PI) controller 216. A voltage sensor 218, connected in series with the input filter capacitor 208, senses the capacitor voltage and provides Vc as an output therefrom.

The second output port of the PLL 212 provides phase data θs, associated with a waveform representative of the grid supply voltage Vs, as an input to a combiner 220. The phase data θs is combined with a local reference signal π/2 to produce a phase value θm. The phase value θm is provided as an input to a pulse width modulation (PWM) rectifier 222. A programmable modulation index module 224 produces a modulation index value M that is also provided as an input to the PWM rectifier 222. An output of the PWM rectifier 222 is provided as an input to the AC/DC converter rectifier 210.

The programmable modulation index module 224 facilitates control of the modulation index M(t) of the converter rectifier 210, when the rectifier converter operates as an inverter. Standard computer system components, discussed more fully below, facilitate programmability of the modulation index module 224.

When the converter rectifier 210 operates as an inverter, the modulation index M(t) is controlled, along with an inverter firing angle. The inverter firing angle is equivalent to the phase value θm of the voltage waveform Vs.

In the exemplary pre-charge circuit 200, the PLL 212 provides an ability to synchronize phase data (e.g., θs) from waveforms representative of the grid AC voltage Vs and an equivalent of a voltage of the inverter.

In the exemplary embodiment of FIG. 2, instead of charging from the AC side, as achieved in the conventional pre-charge circuit 100 of FIG. 1, the pre-charge circuit 200 provides pre-charging on the DC side 200b. The pre-charge circuit 200 uses a constant voltage transformer (CVT) 225 to perform the pre-charging (discussed more fully below). This exemplary approach eliminates the need for damping resistors, such as the damping resistors 106 of FIG. 1. The CVT transformer 225 of the pre-charge circuit 200 is relatively small in size in comparison to the damping resistors 106 of the conventional pre-charge circuit 100.

During an exemplary operational scenario, pre-charging occurs during multi-stage process. During stage 1, a contactor 226 is closed. Upon closure of the contactor 226, the pre-charge CVT 225 supplies a DC voltage (e.g., 220V RMS) from a DC power source 115. During this stage, the CVT 225 delivers a nearly constant DC link current (Idc) to charge a DC-side capacitor 228. The DC link current Idc is required by the converter rectifier 210 to achieve normal operating conditions.

The modulation index for the AC/DC converter rectifier 210 is desirably set to a maximum level M2. The pre-charge current (Iin) at the dc-side 200b from the CVT 225 is sufficiently high to ensure the filter capacitor voltage Vc substantially equals the grid supply voltage Vs at a modulation index M1, slightly less than the maximum modulation index value M2.

As noted above, an advantage offered in embodiments is the ability to reduce the in-rush current flowing across the input filter capacitor 208, without the need for bulky damping resistors. In the embodiments, to reduce the in-rush current flowing through the input filter capacitor 208, the modulation index associated with the AC/DC converter rectifier 210 can be controlled. This control is achieved during a stage 2.

More specifically, in stage 2, once the DC-side capacitor 228 is charged to the rated dc-link voltage, the modulation index of the AC-DC rectifier 210 at grid-side will be soft-started. That is, at a time t2 (discussed more fully below), the modulation index begins to increase from zero to a final value Mf in accordance with a pre-programmable rule. This final value Mf can be programmed by a user to allow the DC-side 200b to deliver a nearly constant pre-charge power. After the modulation index reaches the final value Mf, the filter capacitor 208 will be reasonably close to the grid supply voltage Vs. During this mode, the AC/DC converter rectifier 210 operates as an inverter.

In order for the filter capacitor 208 to be charged close to the grid supply voltage Vs, the AC/DC converter rectifier 210 is used to increase the modulation index from zero to the modulation index M1, noted above.

The PLL 212 is used to synchronize the grid side voltage amplitude Vs and phase θs. Once the amplitude Vs and phase θs information of the grid side is obtained, the AC/DC converter rectifier 210 can be used to charge the capacitor voltage Vc from a lower value to the grid supply voltage Vs, within a close measure of control.

Using this approach, the capacitor voltage Vc will have a very small overshoot, if any, within the pre-charge condition. Additionally, the modulation index can be preprogrammed to achieve constant power output during the pre-charge condition. In this way, the pre-charge CVT 225 can be optimally designed to achieve an optimal exchange of power with the filter capacitor 208.

During stage 3, the modulation index reaches the final value Mf. When the modulation index reaches the final value mf, the PI controller 216, which regulates the voltage error, is initialized. The integral part of the PI controller 216 desirably equals to the final modulation index, Mf, to enable fast PI loop control. The PI controller 216 can finally be used to adjust the modulation index to achieve a condition where Vc substantially equals Vs.

That is, once the modulation index reaches the operating final value Mf, the PI controller 216 regulates the capacitor voltage Vc. The purpose is to control the modulation index to maintain the capacitor voltage Vc close to the grid supply voltage Vs.

In stage 4, when Vc substantially equals Vs, the contactor 204 closes. Since the Vs amplitude and phase are synchronized, a supply current Is remains zero. At the same time, the PI controller 216 is disabled and the modulation index of the PWM rectifier 222 is gradually reduced to zero over this stage, while the dc-link current Idc is kept constant by the pre-charge converter 210.

Also during stage 4, the power supplied to the filter capacitor 208 will be transferred from the PWM rectifier 222 to the AC/DC converter rectifier 210. The amplitude of the supply current Is increases as the amplitude of the current provided by the PWM rectifier 222 decreases according to the pre-programmed modulation index. The preprogrammed modulation index facilitates a smooth increase of the supply current Is from the medium voltage grid supply 101.

Additionally, when the contactor 204 is closed, the current I1 flowing through the inductor 206 will be gradually increased from zero to a nominal operating value. Vc is substantially equal to Vs so there is no in-rush current flowing through the input filter 200.

The preprogrammed value is used to enable the current I1 to flow through the inductor 206 so that the current I1 can be gradually increased from zero to the nominal operating value. Also, the voltage across the capacitor can be smoothly increased and decreased.

In stage 5, once the modulation index has reached zero, the CVT 25 can be disabled by opening the contactor 226. At this time, the input filter 200 is fully supplied by the utility medium voltage grid 101 and the converter 210 will operate on its own as the CVT pre-charge transformer will be isolated from the remaining portion of the DC-side 200b.

Figure 3:
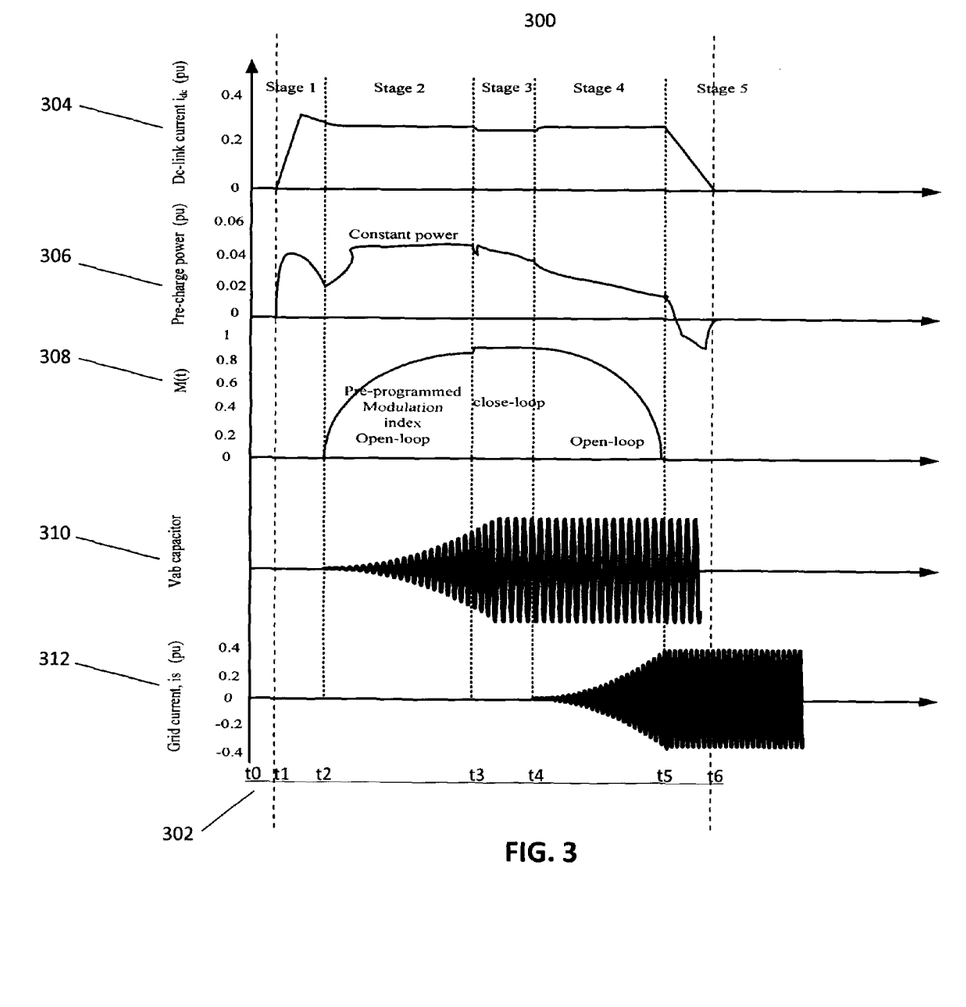
FIG. 3 is a graphical illustration of an exemplary timing diagram in association with the illustration of FIG. 2.

FIG. 3 is a graphical illustration of an exemplary timing diagram 300 in association with the illustration of FIG. 2. More specifically, the timing diagram 300 provides a timing correlation between stages 1-5, discussed above, and various components within the exemplary pre-charge circuit 300, along a timeline 302.

During stage 1, for example, at a time t0 along the timeline 302, DC link current Idc 304 and pre-charge power 306 are both zero. The pre-charge power 306 is indicative of an amount of power delivered from the pre-charge CVT 225. An optimal minimal pre-charge power 306 is sought such that required voltage and size of the CVT 225 can be minimized.

At time t1, the contactor 226 is closed and the pre-charge scheme of the pre-charge circuit 200 begins. More specifically, when the contactor 226 is closed, the CVT 225 begins to charge the DC-side capacitor 228. The DC side capacitor 228 continues to charge to the required DC link voltage until a time t2.

At t2 during stage 2, after the DC side capacitor 228 reaches the required link voltage and the DC side capacitor 228 is fully charged, the modulation index M(t) 308 of the AC/DC rectifier 210 is preprogrammed to soft start via the modulation index module 224.

As noted above, at time t2, the modulation index begins increasing from zero to the final value Mf (e.g., achieved at t3) according to preprogrammed instructions. The preprogrammed instructions enable the DC-side to deliver a nearly constant pre-charge power 306, as illustrated in FIG. 3. This process continues until commencement of stage 3, at time t3. The time lapse between t2 and t3 is referred to herein as a time quanta.

Also at time t2, capacitor voltage Vab 310, which is equivalent to the line voltage between a phase A and phase B, is indicative of how phase voltage is charged from zero to a specified value. That is, during stage 2, the modulation index M is in the soft start mode and will be gradually increased from zero to the normal operating value. The capacitor voltage Vab 310 begins to increase from zero to the specified value without any significant overshooting. Once the process transitions to stage 3 at t3, the voltage will continue to rise slightly, eventually achieving the specified value.

During time t3, the controlled modulation index is responsive to closed loop control to maintain the filter capacitor voltage Vc, through closed loop control, to be substantially equal to the grid supply voltage Vs.

During stage 4 at time t4, the modulation index will slowly fall below the normal operating value to zero. During this transition, the modulation index of stage 4 mirrors the modulation index of stage 2. Also during stage 4, the grid current Is 312 increases from zero to a maximum value, achieved at t5. This increase occurs because the modulation M index generated by the AC/DC converter rectifier 210 will drop from maximum value to zero, which means there will be no power delivered from the DC-side 200b to the AC-side 200a.

Since the capacitor voltage Vab 310 was left to be charged to the grid supply voltage Vs, the filter capacitor 208 can be closed through use of contactor 204, such that the grid power 306 will flow to the grid to deliver through the AC/DC converter 210. In this manner, the current will be gradually increased because the modulation index M generated by the AC/DC converter rectifier 210 is gradually decreased from maximum value to zero value.

This process represents a balance of the power between the grid side 200b and the energy generated from the grid side converter. More specifically, the power generated by the AC/DC converter rectifier 210 was reduced so there will be more power generated from the grid—achievement of an ultimate balance.

Once the modulation index M reaches zero at t5, the AC/DC converter rectifier 210 can be disabled by opening the contactor 226. At this point, the pre-charge circuit 200 is fully supplied by the medium voltage grid supply 101.

Figure 4:
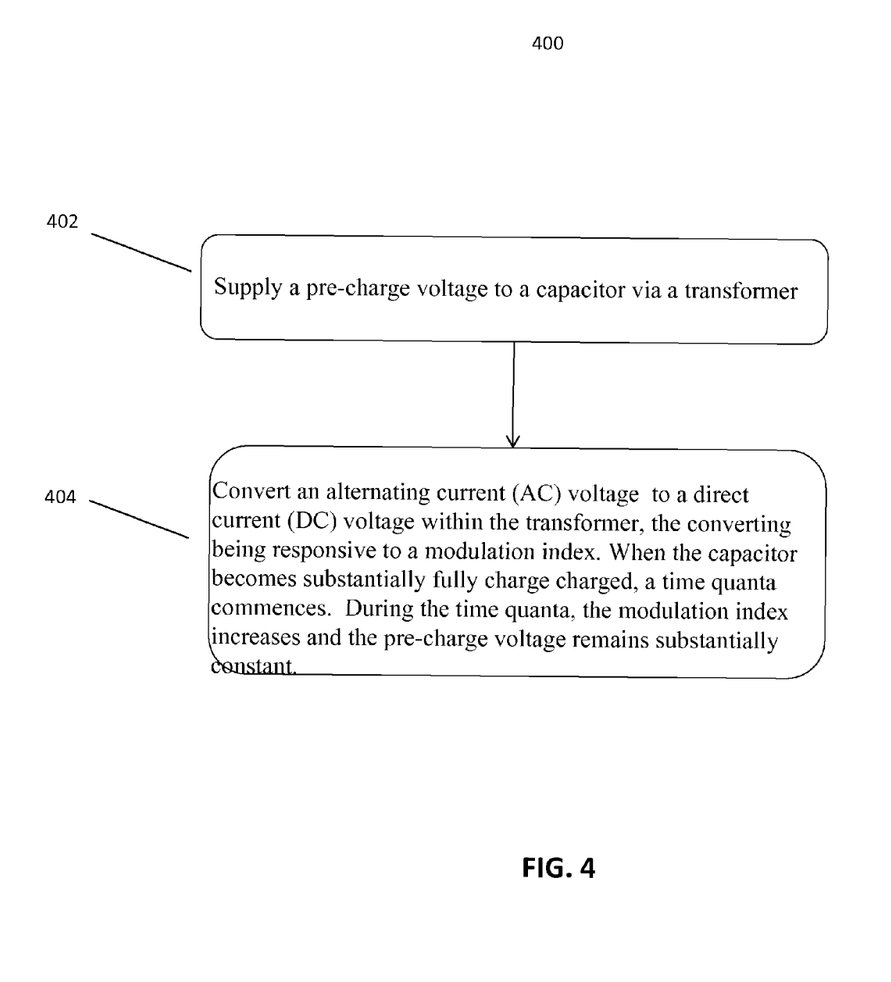
FIG. 4 is a flowchart of an exemplary method of practicing an embodiment of the present invention.

FIG. 4 is a flowchart of an exemplary method 400 of practicing an embodiment of the present invention.

During the method 400, a pre-charge voltage is supplied to a capacitor via a transformer, in step 402. In step 404, an AC voltage is converted to DC voltage within the transformer, the converting being responsive to a modulation index. When the capacitor becomes substantially fully charge charged, a time quanta commences. During the time quanta, the modulation index increases and the pre-charge voltage remains substantially constant.

Figure 5:
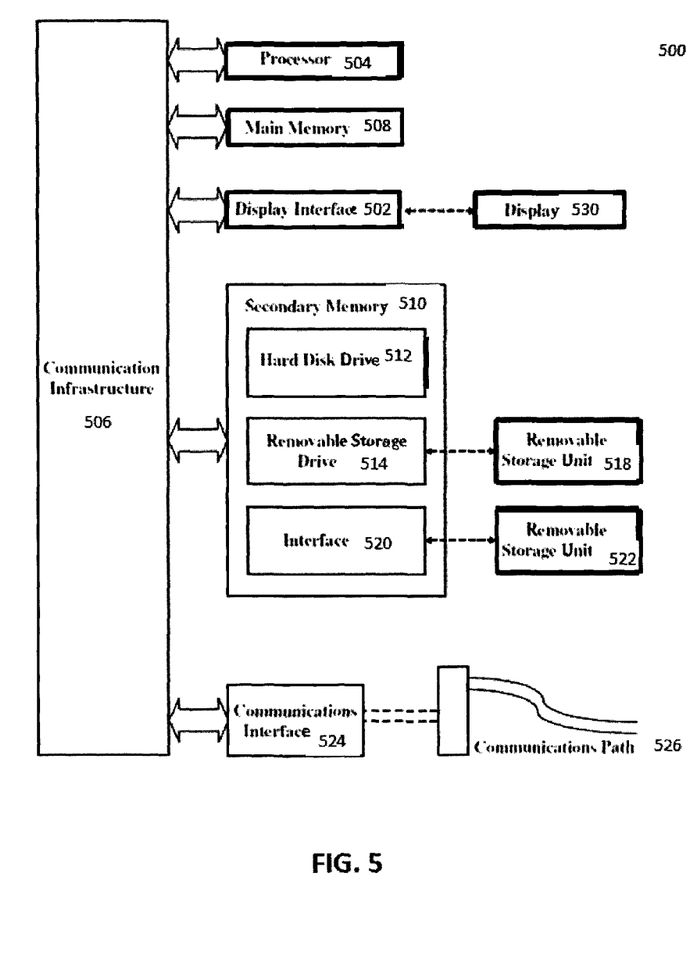
FIG. 5 is an illustration of an exemplary computer system in which embodiments of the present invention can be implemented.

Various aspects of the present invention may be implemented in software, firmware, hardware, or a combination thereof. FIG. 5 is an illustration of an example computer system 500 in which embodiments of the present invention, or portions thereof, can be implemented as computer-readable code. For example, the method illustrated by flowchart 100 of FIG. 2 can be implemented in computer system 500. Various embodiments of the present invention are described in terms of this example computer system 500. After reading this description, it will become apparent to a person of ordinary skill in the relevant art how to implement embodiments of the present invention using other computer systems and/or computer architectures.

Computer system 500 includes one or more processors, such as processor 504. Processor 504 may be a special purpose or a general purpose processor. Processor 504 is connected to a communication infrastructure 506 (e.g., a bus or network).

Computer system 500 also includes a main memory 508, e.g., random access memory (RAM), and may also include a secondary memory 510. Secondary memory 510 can include, for example, a hard disk drive 512, a removable storage drive 514, and/or a memory stick. Removable storage drive 514 can include a floppy disk drive, a magnetic tape drive, an optical disk drive, a flash memory, or the like. The removable storage drive 514 reads from and/or writes to a removable storage unit 518 in a well known manner.

Removable storage unit 518 can comprise a floppy disk, magnetic tape, optical disk, etc. which is read by and written to by removable storage drive 514. As will be appreciated by persons skilled in the relevant art, removable storage unit 518 includes a computer-usable storage medium having stored therein computer software and/or data.

In alternative implementations, secondary memory 510 can include other similar devices for allowing computer programs or other instructions to be loaded into computer system 500. Such devices can include, for example, a removable storage unit 522 and an interface 520. Examples of such devices can include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, or the like. Software and data transferred via communications interface 524 are in the form of signals, which may be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a radio frequency (RF) link or other communications channels.

In this document, the terms "computer program medium" and "computer-usable medium" are used to generally refer to media such as removable storage unit 518, removable storage unit 522, and a hard disk installed in hard disk drive 512. Computer program medium and computer-usable medium can also refer to memories, such as main memory 508 and secondary memory 510, which can be memory semiconductors (e.g., DRAMs, etc.). These computer program products provide software to computer system 500.

Computer programs (also called computer control logic) are stored in main memory 508 and/or secondary memory 510. Computer programs may also be received via communications interface 524. Such computer programs, when executed, enable computer system 500 to implement embodiments of the present invention as discussed herein. In particular, the computer programs, when executed, enable processor 504 to implement processes of embodiments of the present invention. Accordingly, such computer programs represent controllers of the computer system 500. Where embodiments of the present invention are implemented using software, the software can be stored in a computer program product and loaded into computer system 500 using removable storage drive 514, interface 520, hard drive 512, or communications interface 524.

As noted above, embodiments of the present invention provide The proposed input filter pre-charge achieves the commercial benefits of a smoother and programmable connection of the LC filter to the grid supply; eliminates the need for the pre-charge resistor and in additional contactor, which is a cost-saving solution for high power applications. The embodiments also eliminate in-rush current and overvoltage across the filter capacitor, enabling the achievement of an optimized and controllable pre-charge profile.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A device, comprising:
a transformer configured to supply a pre-charge voltage to a capacitor; and
a converter configured for coupling to the transformer and responsive to an increasing modulation index;
wherein the modulation index increases for a time quanta after the capacitor becomes substantially fully charged; and
wherein the pre-charge voltage is substantially constant during the time quanta.

2. The device of claim 1, wherein charging occurs from a direct current (DC) side of the device.

3. The device of claim 1, further comprising an inductor connected in series with a capacitor;
wherein the inductor and the capacitor are coupled to an alternating current (AC) side of the converter; and
wherein the device forms a pre-charging input filter, the input filter being devoid of damping resistors.

4. The device of claim 3, further comprising a phase locked loop (PLL) coupled between the inductor and a connection port of the device.

5. The device of claim 4, further comprising a pulse width modulation (PWM) rectifier coupled between an output of the PLL and the converter.

6. The device of claim 5, further comprising a modulation index module for controlling the modulation index.

7. The device of claim 6, wherein the modulation index module is programmable.

8. The device of claim 7, wherein the modulation index increases to a user programmable maximum value.

9. The device of claim 7, wherein the connection port is configured for coupling to an AC voltage supply.

10. The device of claim 1, wherein the modulation index is monotonically increasing.

11. The device of claim 1, wherein the capacitor is a direct current (DC) side component.

12. A method for pre-charging an input filter, comprising:
supplying a pre-charge voltage to a capacitor within the input filter via a transformer; and
converting an alternating current (AC) voltage to a direct current (DC) voltage within the transformer, the converting being responsive to a modulation index;
wherein after the capacitor becomes substantially fully charge charged, a time quanta commences; and
wherein during the time quanta, the modulation index increases and the pre-charge voltage remains substantially constant.

13. The method of claim 12, wherein the modulation index is a function of an input AC voltage waveform.

14. The method of claim 13, wherein the modulation index monotonically increases during the time quanta.

15. The method of claim 14, wherein the modulation index is user programmable.

16. The method of claim 12, wherein the pre-charge voltage is a DC voltage.

17. A tangible computer-readable medium having stored thereon, computer-executable instructions that, if executed by a computing device, cause the computing device to perform a method comprising:
supplying a pre-charge voltage to a capacitor via a transformer; and
converting an alternating current (AC) voltage to a direct current (DC) voltage within the transformer, the converting being responsive to a modulation index;
wherein after the capacitor becomes substantially fully charge charged, a time quanta commences; and
wherein during the time quanta, the modulation index increases and the pre-charge voltage remains substantially constant.

18. The tangible computer readable medium of claim 17, wherein the modulation index monotonically increases during the time quanta.

19. The tangible computer readable medium of claim 18, wherein the modulation index is a function of an input AC voltage waveform.

20. The tangible computer readable medium of claim 19, wherein the modulation index increases to a user programmable maximum value.

* * * * *